United States Patent [19]

Tsuno et al.

[11] Patent Number: 5,906,650
[45] Date of Patent: May 25, 1999

[54] DESCENDING GRADE CONDITION DETECTING APPARATUS

[75] Inventors: Tadaaki Tsuno, Oobu; Shoichi Masaki, Chiryu, both of Japan

[73] Assignee: Nippondenso Co., Ltd., Kariya, Japan

[21] Appl. No.: 08/685,843

[22] Filed: Jul. 24, 1996

[30] Foreign Application Priority Data

Jul. 24, 1995 [JP] Japan .................................. 7-187121
May 23, 1996 [JP] Japan .................................. 8-128617

[51] Int. Cl.$^6$ ......................................................... B60T 8/00
[52] U.S. Cl. .................................. 701/71; 701/73; 701/80
[58] Field of Search .................................. 701/71, 73, 74, 701/78, 80, 82, 83, 79; 303/138, 139

[56] References Cited

U.S. PATENT DOCUMENTS

| | | | |
|---|---|---|---|
| 4,651,290 | 3/1987 | Masaki et al. | 701/80 |
| 4,823,269 | 4/1989 | Fujioka et al. | 701/90 |
| 5,001,640 | 3/1991 | Matsumoto et al. | 701/77 |
| 5,056,354 | 10/1991 | Kuwana et al. | 73/9 |
| 5,070,459 | 12/1991 | Van Zanten et al. | 701/78 |
| 5,150,298 | 9/1992 | Fujioka et al. | 701/79 |
| 5,210,693 | 5/1993 | Kuwana et al. | 701/75 |
| 5,216,608 | 6/1993 | Ito et al. | 701/90 |
| 5,236,255 | 8/1993 | Kuwana et al. | 303/158 |
| 5,586,028 | 12/1996 | Sekine et al. | 701/36 |

FOREIGN PATENT DOCUMENTS 3-007648  1/1991  Japan .
6-027679  4/1994  Japan .

*Primary Examiner*—Tan Q. Nguyen
*Attorney, Agent, or Firm*—Pillsbury Madison & Sutro LLP

[57] ABSTRACT

A descending grade condition detecting system which can accurately detect a descending grade such as a snow-packed road or the like where slippage is likely determines whether permission has been granted to perform descending grade determination. If so, it determines whether established vehicle body deceleration is 0.3 G or less. If so, the system determines whether a road surface at each of the wheels is low $\mu$ corresponding to a snow-packed road or the like. If estimated vehicle body deceleration is small and of comparatively high $\mu$, descending grade condition flags KF are set for the respective wheels for which determination thereof has been made to indicate that a condition of a road being traveled is a condition of a low $\mu$ descending grade of a snow-packed road or the like.

14 Claims, 13 Drawing Sheets

FIG. 9
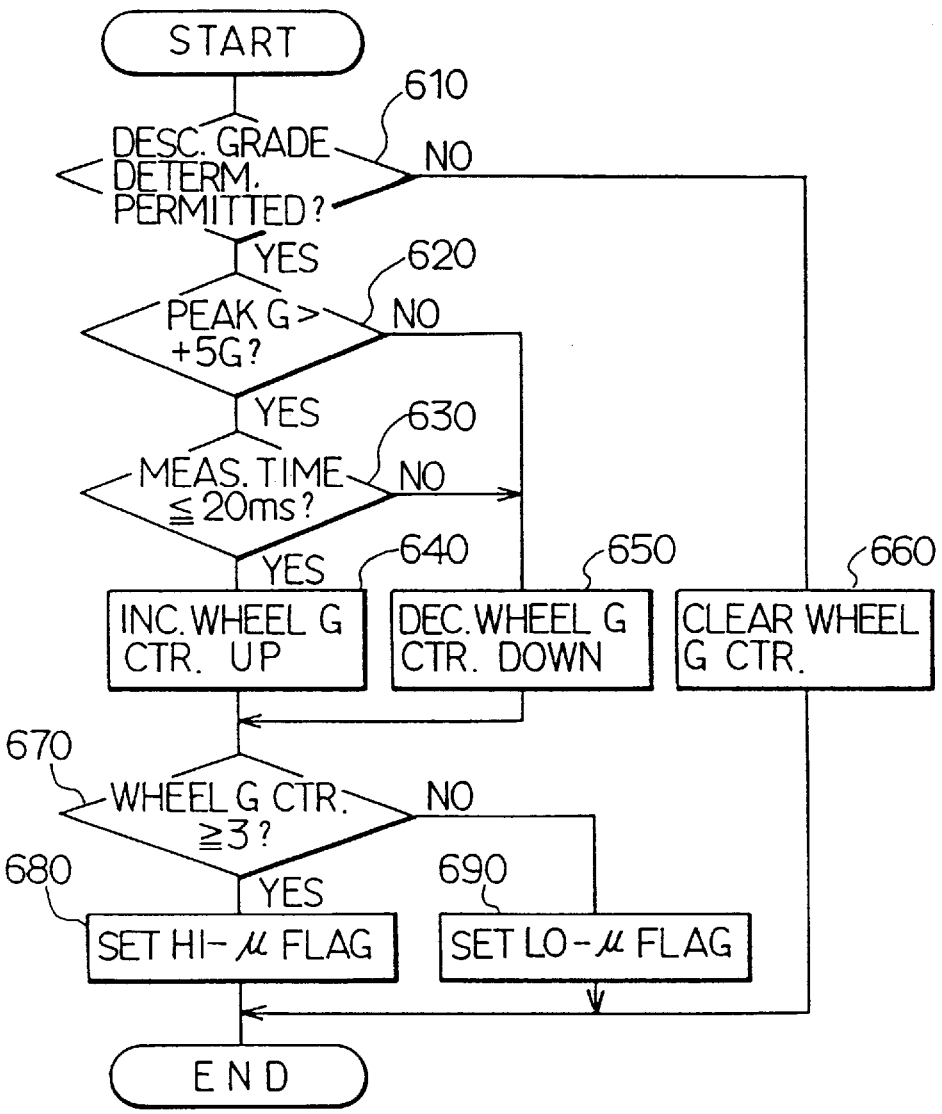
FIG. 18A
PRIOR ART
FIG. 18B
PRIOR ART
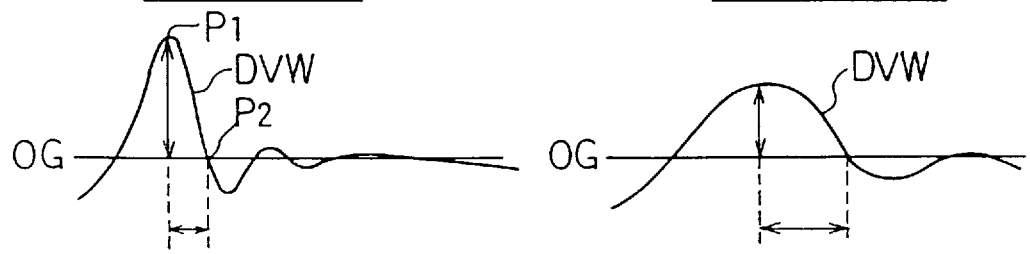

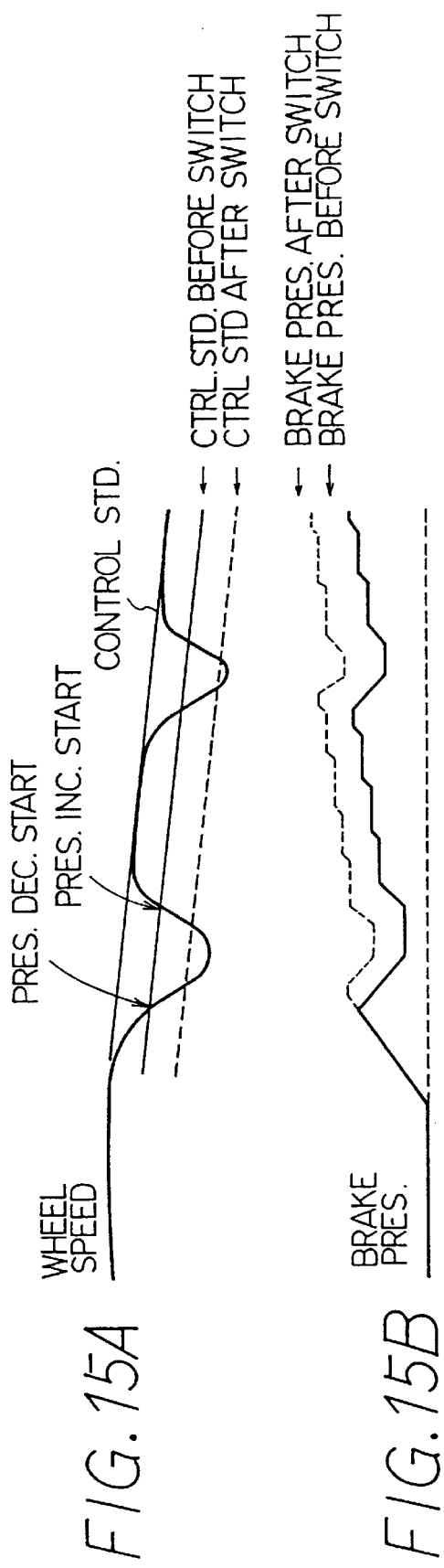

DESCENDING GRADE CONDITION DETECTING APPARATUS

CROSS-REFERENCE TO RELATED APPLICATIONS

The present application is related to and claims priority from Japanese Patent Application Nos. Hei 7-187121 and 8-128617, incorporated herein by reference.

BACKGROUND OF THE INVENTION

1. Field of the Invention

The present invention relates to a descending grade condition detecting apparatus which can detect a descending grade such as a snow-packed road or the like where slippage is likely, and to a brake controlling apparatus which can perform anti-skid control and the like based on a descending grade condition detected by this descending grade condition detecting apparatus.

2. Description of Related Art

In recent years, increased implementation of electronic control relating to the suspension of a vehicle has been remarkable, and an anti-skid control apparatus is known as a representative example thereof.

According to this anti-skid control apparatus, as shown in FIG. 17, estimated vehicle body speed is calculated based on wheel speed obtained by wheel speed sensors arranged at the vehicle wheels, and estimated vehicle body deceleration indicating change in estimated vehicle body speed (i.e., indicating a slope of estimated vehicle body speed) is calculated from estimated vehicle body speed. Accordingly, the estimated vehicle body deceleration calculated in this way may be employed as road surface $\mu$ information, and this estimated vehicle body deceleration may be used as a control parameter for anti-skid control.

That is, when anti-skid control is performed, estimated vehicle body deceleration is sequentially calculated at each unit of time, control of brake hydraulic pressure is performed in accordance with the values of estimated vehicle body deceleration and hydraulic control corresponding to the road surface $\mu$ is implemented.

However, in a vehicle equipped with an anti-skid control apparatus such as this, when braking has been performed on a low $\mu$ descending grade which is susceptible to slippage, such as a snow-packed road or the like, the wheels may rotate in excess of what is predicted due to an effect of low hydraulic pressure for control by anti-skid control and of gravitational forces which act in the gradient direction of the descending grade, and because of this, a decline in estimated vehicle body deceleration formulated based on wheel speed may occur.

That is, when braking has been performed on a descending grade which is susceptible to slippage, such as a snow-packed road or the like, wheel speed becomes greater in comparison with a case where braking has been performed on a level road having a similar road surface $\mu$, and as a result thereof, estimated vehicle body speed becomes large, as shown by the dotted line in FIG. 17. For this reason, the estimated vehicle body deceleration (i.e., the slope of the graph) calculated from this estimated vehicle body speed becomes small.

That is, because estimated vehicle body deceleration becomes smaller on a descending grade than on a level road, even when the descending grade and level road are similar snow-packed roads, an extent of slippage is considered to be larger (being an extremely low $\mu$ road of, for example, an icy road) on the descending grade even with similar brake hydraulic pressure, and to alleviate slippage, control is executed on the side to lower brake hydraulic pressure. As a result thereof, there exists a problem wherein braking performance is reduced on a descending grade in comparison with a case where braking is performed on a level road.

SUMMARY OF TEE INVENTION

Accordingly, it is a first object of the present invention to provide a descending grade condition detecting apparatus which can accurately detect a descending grade such as a snow-packed road or the like where slippage is likely, and a brake controlling apparatus which can perform anti-skid control or the like based on the detection result.

Further, it is a second object of the present invention to provide a brake controlling apparatus which can cause vehicle body deceleration on a descending grade to be increased and which can shorten a braking distance of a vehicle by increasing brake hydraulic pressure applied to a member causing wheel braking force to be generated on a descending grade road.

The above objects are achieved according to a first aspect of the present invention by providing a system in which information relating to wheel speed subsequent to reduction of brake hydraulic pressure is determined by a wheel speed information detecting device, estimated vehicle body deceleration is calculated based on this information relating to wheel speed by an estimated deceleration calculating device, a road friction coefficient is calculated by a road friction coefficient calculating device based on this information relating to wheel speed, and a condition of a descending grade road is detected on basis of this road friction coefficient and estimated wheel deceleration by a descending grade condition detecting device.

That is, according to this invention, a condition of a descending grade road can be detected based on a road friction coefficient and estimated vehicle body deceleration obtained from information relating to vehicle body speed. In this way, the system can detect a descending grade condition of a low $\mu$ descending grade of a road surface having a road surface $\mu$ which is less than or equal to a pressed snow road surface, for example a mirror-surface road, based on estimated vehicle body deceleration and a road friction coefficient.

Preferably, wheel speed is employed as information relating to wheel speed utilized in calculation of estimated vehicle body deceleration. Also, it is preferable that wheel speed or wheel acceleration is employed as information relating to wheel speed utilized in calculation of a road friction coefficient.

Where, for example, wheel acceleration is employed to determine the magnitude of road friction (road $\mu$), a state of change of wheel acceleration differs for a low $\mu$ road such as a snow-packed road or the like and for an extremely low $\mu$ road such as an icy road or the like, as shown in FIGS. 18A and 18B, and so the magnitude of road $\mu$ can be known from this state of change. Further, to indicate the magnitude of road $\mu$, a low $\mu$ road is termed a comparatively high $\mu$ road, and an extremely low $\mu$ road is termed a comparatively low $\mu$ road in the following discussion.

Additionally, where, for example, wheel speed is employed to determine the magnitude of road $\mu$, the magnitude of road $\mu$ can be known by performing discrimination according to an amount that wheel speed recovers subsequent to reduction of brake hydraulic pressure (i.e., an extent of recovery with respect to vehicle body speed prior to pressure reduction), similar to the case of wheel acceleration.

In this way, the system can utilize wheel speed or wheel acceleration as information relating to wheel speed employed in calculation of a road friction coefficient.

Further preferably, the magnitude of road $\mu$ can be determined based on time from a wheel acceleration peak value (peak G) until change to a predetermined level (for example, 0 G). Furthermore, it is also acceptable give consideration to peak value magnitude in determining road $\mu$ with an object being to improve accuracy of detection.

Also, it is preferable that a descending grade condition is determined to be a condition of a descending grade of low friction coefficient of packed snow or the like when estimated vehicle body deceleration is a predetermined value or less and road friction coefficient is a predetermined value or more.

To better explain this principle, wheel speed is a higher value on a descending grade of low $\mu$ such as a snow-packed road or the like than on a level road, and so estimated vehicle body deceleration (DVB) becomes smaller as shown in FIG. 1A, whereas road $\mu$ calculated from wheel acceleration and the like indicates a low $\mu$ (i.e., not less than a predetermined value indicating a boundary with extremely low $\mu$) in correspondence with the road condition of the descending grade, as shown in FIG. 18B, and so when estimated vehicle body deceleration and road friction coefficient are understood, travel of the vehicle on a descending grade having a low friction coefficient of a snow-packed road or the like can be detected.

In this way, the system performs determination wherein estimated vehicle body deceleration is a predetermined value or less and a road friction coefficient is a predetermined value or more, and so it can accurately detect a descending grade condition having the low friction coefficient of a snow-packed road or the like.

Also, it is preferable that detection of a descending grade condition is performed at each of the wheels, and so brake hydraulic pressure of the wheels can be controlled appropriately.

Also, it is preferable that an average value of estimated vehicle body deceleration during a predetermined period is utilized as estimated vehicle body deceleration, and so accuracy of estimated vehicle acceleration is improved, and, due thereto, accuracy of detection of a descending grade condition is also improved.

Moreover, it is preferable that a descending grade condition is determined to be a condition of a descending grade of low friction coefficient of packed snow or the like when an average value of estimated vehicle body deceleration is a predetermined value or less and a road friction coefficient at left and right wheels is a predetermined value or more. Accordingly, a descending grade condition can be detected more accurately than determination merely in a case of the individual wheels described above.

It is also preferable that brake control of the vehicle is performed based on a descending grade condition determined by the descending grade condition detecting apparatus, and so, for example, anti-skid control or the like can be favorably performed. Also, it is possible that brake hydraulic pressure is regulated on a side wherein vehicle wheel braking force increases and anti-skid control is performed when a condition of a descending grade of low friction coefficient of packed snow or the like has been detected by the descending grade condition detecting apparatus.

The principles of anti-skid control performed based on a result of detecting a descending grade condition will be described with reference to FIGS. 1A–1D.

Estimated vehicle body deceleration, wheel speed, and brake hydraulic pressure changed when anti-skid control is performed on a descending grade of low $\mu$ of a snow-packed road or the like, as shown by the solid lines in FIGS. 1A–1D. That is, wheel speed becomes large on a descending grade of low $\mu$ due to gravity and the like, and so estimated vehicle body deceleration (DVB) declines, and a level road of extremely low $\mu$ (wherein slippage is great) is determined, and control to reduce brake hydraulic pressure (shown by the solid line in FIG. 1C) is performed. That is, brake hydraulic pressure is reduced to correspond to an extremely low $\mu$ road despite being in actuality a low $\mu$ road, and so braking performance is reduced.

In this regard, a low $\mu$ descending grade can accurately be detected by the above-described descending grade condition detecting apparatus according to this invention, and so in this case, braking performance can be improved by prohibiting control brake hydraulic pressure (shown by the solid line in FIG. 1C) corresponding to an extremely low $\mu$ road as in the prior art and employing control (shown by the dotted line in FIG. 1C) corresponding to a low $\mu$ road, i.e., by establishing brake hydraulic pressure to be higher than in the prior art.

Also, it is possible that brake hydraulic pressure is regulated on a side wherein wheel braking force increases and anti-skid control is performed when a condition of a descending grade of low friction coefficient of packed snow or the like at each wheel has been detected by the descending grade condition detecting apparatus. Accordingly, anti-skid control can favorably be performed for each individual wheel.

Further preferably, brake hydraulic pressure is regulated on a side wherein braking force of all wheels increases and anti-skid control is performed with respect to all wheels when a condition of a descending grade of low friction coefficient of packed snow or the like relating to all wheels has been detected by the descending grade condition detecting apparatus.

That is, anti-skid control can be performed appropriately with respect to all wheels in correspondence with a condition of an actual descending grade, and so braking performance is greatly improved in comparison with a case wherein anti-skid control is performed merely with respect to the wheels.

It is preferable that the system includes a device to perform switching of a control reference to determine starting and ending timing of varying pressure output of brake hydraulic pressure and regulation of amount of varying pressure output of brake hydraulic pressure can be employed as anti-skid control performed on a side wherein vehicle wheel braking force of each of the vehicle wheels increases. That is, in the present invention, starting and ending timing of varying pressure output of brake hydraulic pressure are in particular regulated, and so control can be performed rapidly and precisely in comparison with a case wherein merely regulation of the amount of varying pressure output alone is performed.

Preferably, increasing pressure control of brake hydraulic pressure applied to a braking force generating device by a varying pressure controlling device is performed when a present traveling surface has been determined to be a descending grade condition by a descending grade condition detecting device.

That is, because the wheels may rotate in excess of what is predicted due to an effect of force which acts in the gradient direction as was described above, when anti-skid control is executed, a pressure varying device in an anti-skid controlling device or the like is utilized so that hydraulic pressure rises to brake hydraulic pressure corresponding to rotating force of the wheel due to this gradient and to a road limit in a relationship of this vehicle and the road, and brake fluid pressure applied to a member causing wheel braking force to be generated is increased. When this is done, wheel deceleration of a descending grade road can be sufficiently learned and vehicle stopping distance also can be shortened.

Further, when increasing pressure due to a road friction condition of a descending grade road is restricted during execution of pressure increase by a varying pressure control device on a descending grade road, it is preferable that control which does not increase pressure can be executed on an extremely low $\mu$ road wherein, for example, a road limit is quickly reached and considerable deceleration is not performed. Because of this, occurrence of an excessive wheel lock state can be prevented, and it is possible to ensure greater vehicle stability. Additionally, when a road friction condition at a time when restricting an increase in brake fluid pressure applied to a member generating wheel braking force is a road friction coefficient equivalent to a snow-packed road, it is possible to further accelerate when an increase in pressure has been executed on a descending grade road.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 9 is a flowchart showing road friction coefficient height detecting processing according to the first embodiment;

FIGS. 15A and 15B are graphs showing anti-skid control processes in the second embodiment;

FIGS. 18A and 18B are graphs showing a state of change in wheel acceleration according to the prior art.

DETAILED DESCRIPTION OF THE PRESENTLY PREFERRED EXEMPLARY EMBODIMENTS

Embodiments of this invention will be described hereinafter with reference to the drawings.

Figure 2:
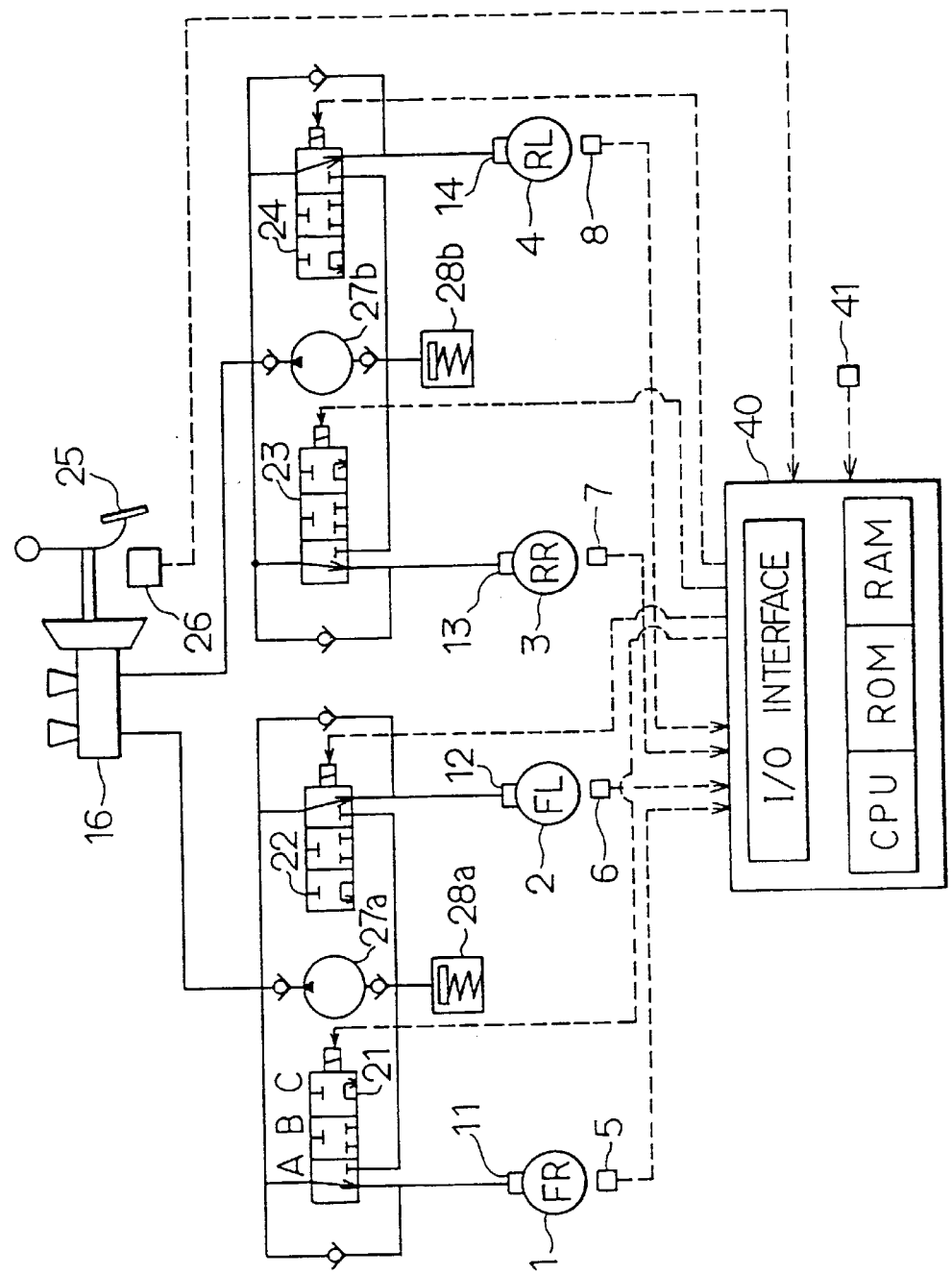
FIG. 2 shows the overall structure of an anti-skid control device used as a descending grade condition detecting apparatus according to the first embodiment.
Figure 3:
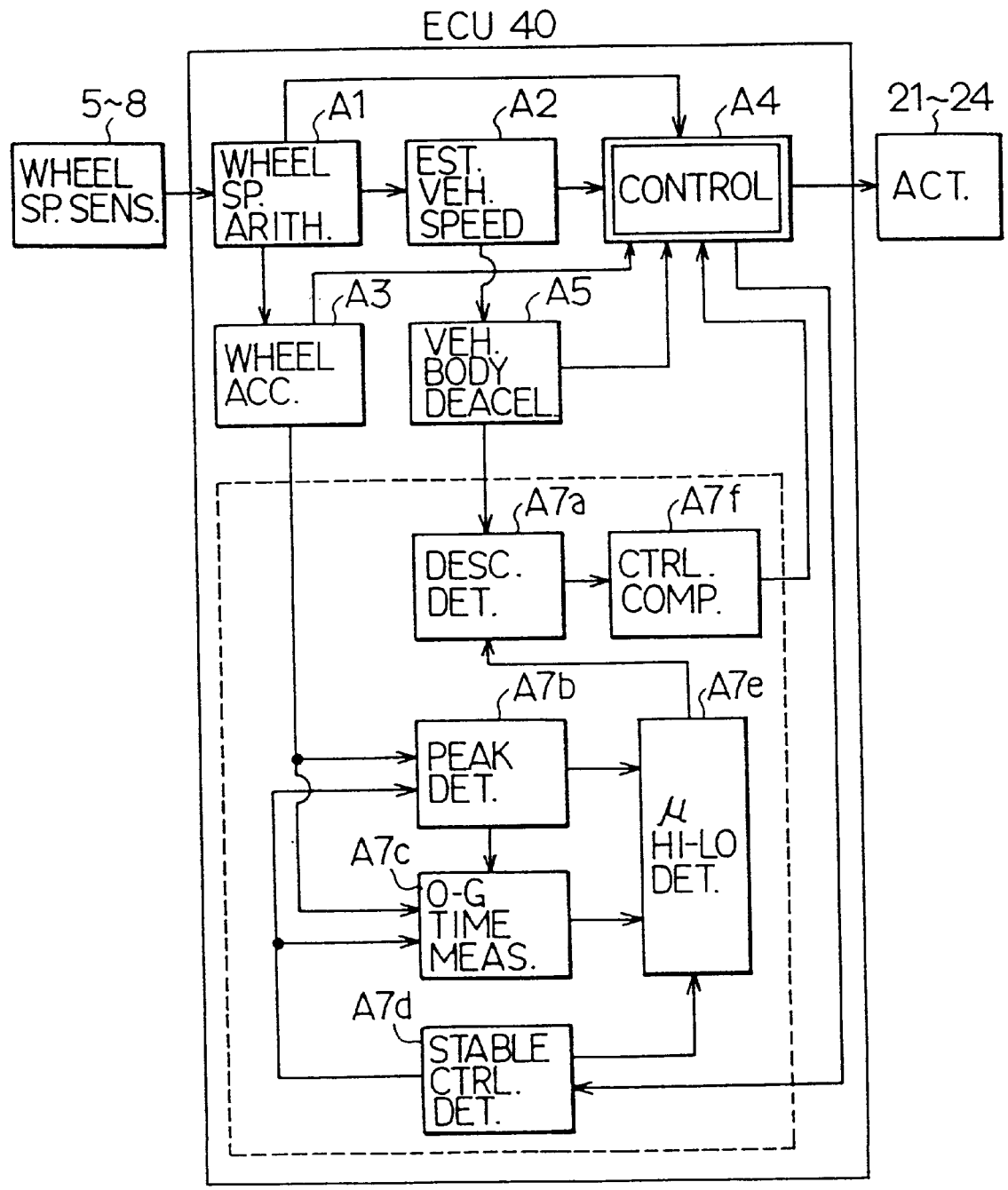
FIG. 3 is block diagram showing a processing sequence according to the first embodiment.

FIG. 2 shows the structure of an anti-skid control system having a descending grade condition detecting apparatus according to this invention. This embodiment is applied to a front engine, rear drive vehicle.

Electromagnetic or electromagnetic-resistive wheel speed sensors 5–8 are respectively disposed on a front-right wheel 1, front-left wheel 2, rear-right wheel 3, and rear-left wheel 4 and output pulse signals having pulse durations corresponding to rotation of the wheels 1–4. Respective hydraulic brake devices (wheel cylinders) 11–14 are disposed on the wheels 1 through 4 for exerting braking forces on the wheels 1–4. Hydraulic pressure from a master cylinder 16 is sent via actuators 21–24 and the hydraulic conduits to the wheel cylinders 11–14.

A depressed state of a brake pedal 25 is detected by a stop switch 26. An "on" signal is output from this stop switch 26 when the brake pedal 25 is depressed and braking of the vehicle is started.

Reservoirs 28a and 28b temporarily store brake fluid expelled from the wheel cylinders 11–14 during anti-skid control at a time of reduction of wheel cylinder pressure and the like. Brake fluid stored in the reservoirs 28a and 28b is taken in by hydraulic pumps 27a and 27b driven by a motor (not shown), and is discharged while maintaining high pressure.

The actuators 21–24 are controlled by an electronic control unit (ECU) 40 and regulate brake hydraulic pressure applied to the wheel cylinders 11–14 during anti-skid control and control braking force with respect to the respective wheels 1–4. The actuators 21–24 are electromagnetic three-way valves having a pressure increasing mode, a pressure reducing mode, and a holding mode; the actuator 21 increases the wheel cylinder pressure of the wheel cylinder at an A position, holds the wheel cylinder pressure at a B position, and allows brake fluid applied to the wheel cylinder 11 to escape and reduces the wheel cylinder pressure at a C position. The other actuators 22–24 also can execute similar operations. In addition, this three-way valve is in the pressure increasing mode when not energized, and during electrification it selectively assumes the holding or pressure reducing mode in accordance with a current level thereof.

The electronic control unit 40 is a microprocessor including a CPU, ROM, RAM, I/O interface and the like. This electronic control unit 40 is supplied with power from a power source (not shown) when an ignition switch 41 is switched on, receives signals from the wheel speed sensors 5–8, performs operational control and the like for brake force control, and outputs drive control signals for the actuators 21–24.

Detection processing for a descending grade condition executed by the electronic control unit 40 will be described next with reference to FIGS. 3–9. First, an overview of a processing sequence according to this embodiment will be described with reference to the block diagram of FIG. 3.

In this Figure, signals of the wheel speed sensors 5–8 are input to a wheel speed arithmetic unit A1, and wheel speed calculated by this wheel speed arithmetic unit A1 is output to an estimated vehicle speed arithmetic unit A2, a wheel acceleration arithmetic unit A3, and a control unit A4.

Estimated vehicle body speed calculated by the estimated vehicle speed arithmetic unit A2 is output to the control unit A4 and an estimated vehicle body deceleration arithmetic unit A5, and estimated vehicle body deceleration calculated by this estimated vehicle body deceleration arithmetic unit A5 is output to the control unit A4 and a descending grade condition detecting unit A7a of a descending grade condition compensating unit A7.

Wheel acceleration calculated by the wheel acceleration arithmetic unit A3 is output to the control unit A4 and to a peak value detecting unit A7b and 0-G time measuring unit A7c of the descending grade condition compensating unit A7.

Information on the presence or absence of anti-skid control from the control unit A4 is output to a stable control region detecting unit A7d of the descending grade condition compensating unit A7.

Information on whether a stable control region (where detection of a descending grade condition is permitted) has been detected by the stable control region detecting unit A7d is output to the peak value detecting unit A7b and the 0-G time measuring unit A7c, as well as to a road friction coefficient high/low detecting unit A7e.

A positive side peak value of wheel acceleration after brake hydraulic pressure reduction detected by the peak value detecting unit A7b is output to the 0-G time measuring unit A7c and the road friction coefficient high/low detecting unit A7e, and time from the positive side peak value of wheel acceleration after pressure reduction until 0 G measured by the 0-G time measuring unit A7c is output to the road friction coefficient high/low detecting unit A7e.

A road friction coefficient (road $\mu$) detected by the road friction coefficient high/low detecting unit A7e is output to the descending grade condition detecting unit A7a.

Information on whether the road is a descending grade susceptible to slippage such as a snow-packed road or the like, detected by the descending grade condition detecting unit A7a based on the foregoing established vehicle body deceleration and height of road $\mu$ is output to a control compensating unit A7f.

Information on a control pattern for varying pressure of brake hydraulic pressure established by the control compensating unit A7f in accordance with the foregoing descending grade condition is output to the control unit A4.

Accordingly, output to control the actuators 21–24 is performed at the control unit A4 based on the foregoing arithmetic results, and brake hydraulic pressure of the wheels 1–4 is controlled.

Figure 4:
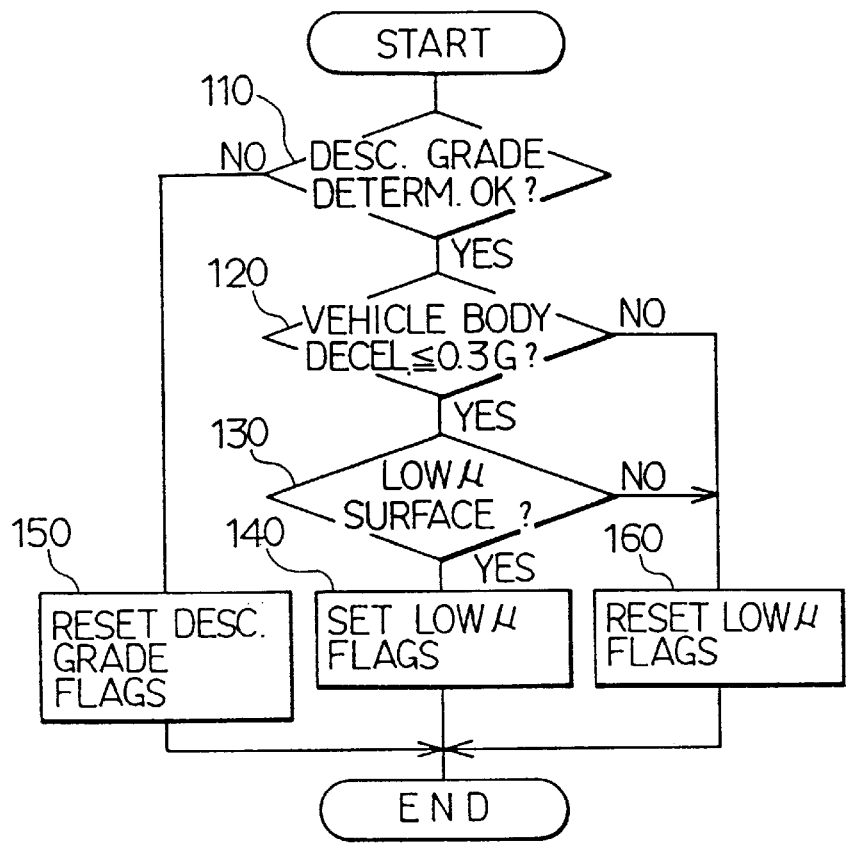
FIG. 4 is a flowchart showing descending grade condition detecting processing in the first embodiment.

Next, an overview of processing to detect a descending grade condition performed at each of the wheels will be described with reference to the flowchart of FIG. 4. This processing is started when the ignition switch 41 is turned on.

Figure 5:
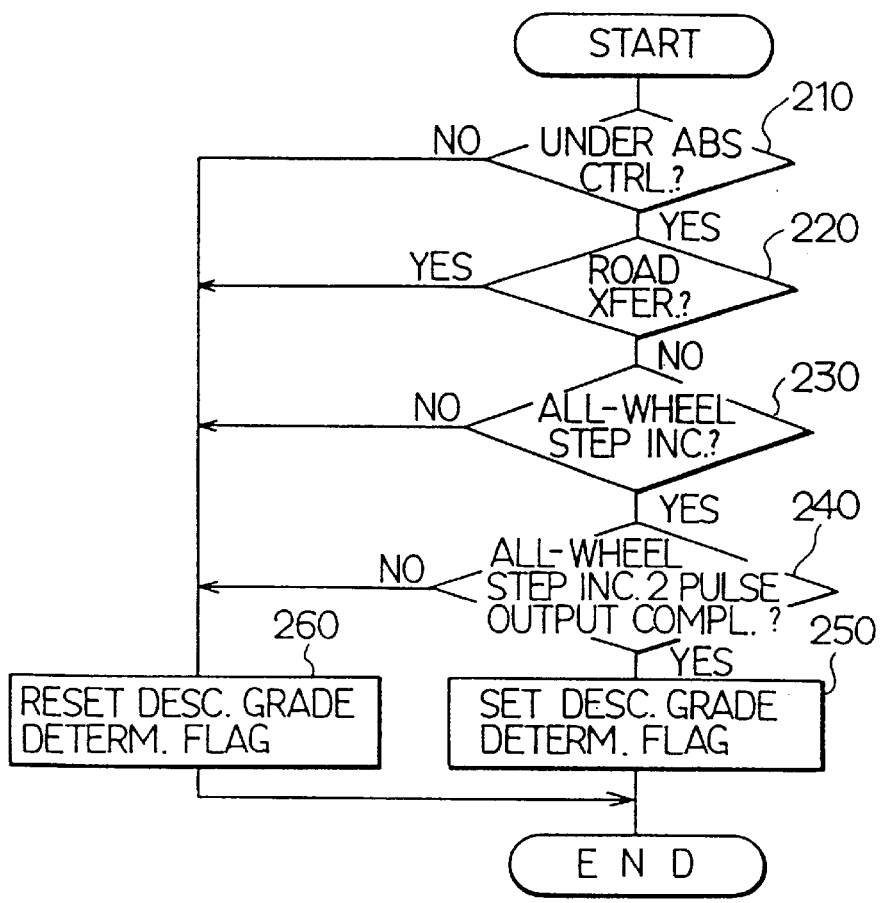
FIG. 5 is a flowchart showing descending grade determination permission processing in the first embodiment.

First, step 110, determines whether permission has been granted to perform descending grade determination, as will be described in detail later with reference to FIG. 5. If so, execution advances to step 120; if not, execution advances to step 150. Processing for this descending grade determination permission improves accuracy of detected results by detecting a descending grade condition which will be described later at a stable control region.

In step 150, descending grade determination permission has not been granted, and so descending grade condition flags KF indicating a condition of a low $\mu$ descending grade of a snow-packed road or the like for each wheel are respectively reset for all wheels, and this processing ends.

Meanwhile, step 120 determines whether established vehicle body deceleration is 0.3 G or less, as will be described in detail later with reference to FIG. 9. If so, execution advances to step 130; if not, execution advances to step 160.

Figure 8:
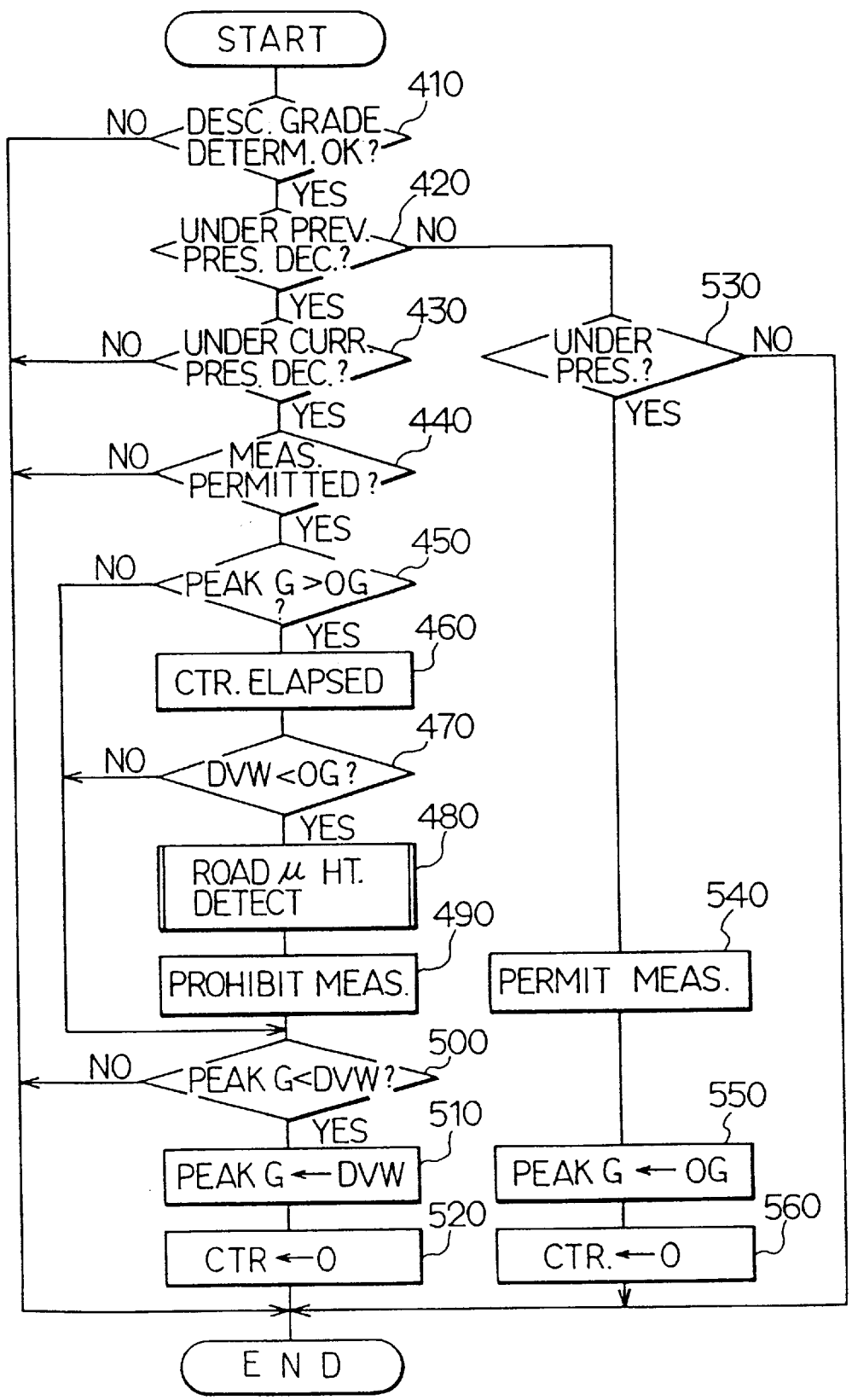
FIG. 8 is a flowchart showing wheel acceleration information extraction processing according to the first embodiment.

Step 130 determines whether the road surface is low $\mu$ (comparatively high $\mu$) of a snow-packed road or the like, as will be described in detail later with reference to FIGS. 8 and 9. If so, execution advances to step 140; if not, execution advances to step 160. As has been described above, "comparatively high $\mu$" indicates a condition of low $\mu$ of a snow-packed road or the like where $\mu$ is high in comparison with an extremely low $\mu$ of an icy road or the like, and this designation of "comparatively high $\mu$" is employed for discrimination with high $\mu$ of an ordinary road and the like.

Step 140 determines in the foregoing steps 120 and 130 whether estimated vehicle body deceleration is small and moreover of comparatively high $\mu$, and so the descending grade condition flags KF are set for the respective wheels for which determination thereof is made to indicate that the road being traveled is a low $\mu$ descending grade of a snow-packed road or the like, and this processing ends.

Meanwhile, in step 160, a condition wherein estimated vehicle body deceleration is small and the road is a comparatively high $\mu$ surface has not been fulfilled, and so respective descending grade condition flags KF indicating the above-described descending grade condition are reset for the respective wheels, and this processing ends.

Figure 6A:
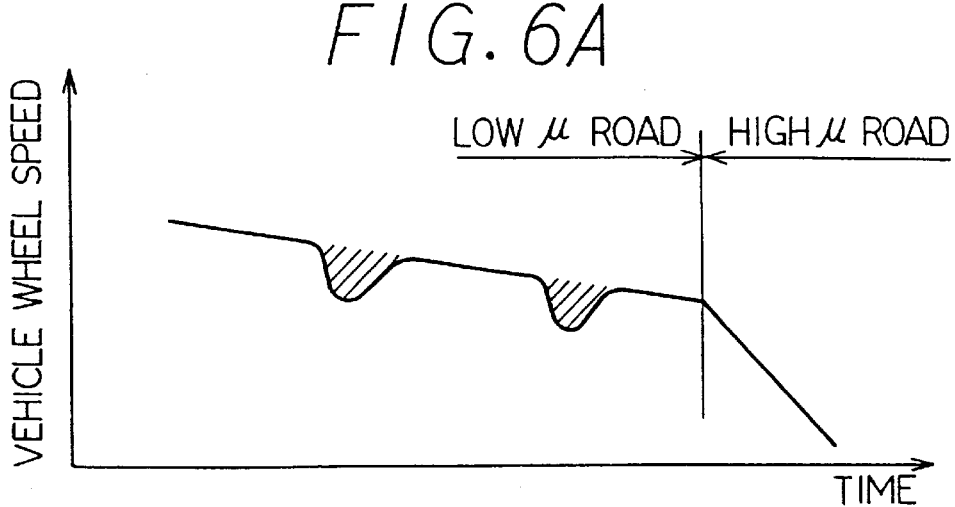
FIGS. 6A and 6B are graphs showing a state of change in wheel speed during change in a road condition in the first embodiment.
Figure 6B:
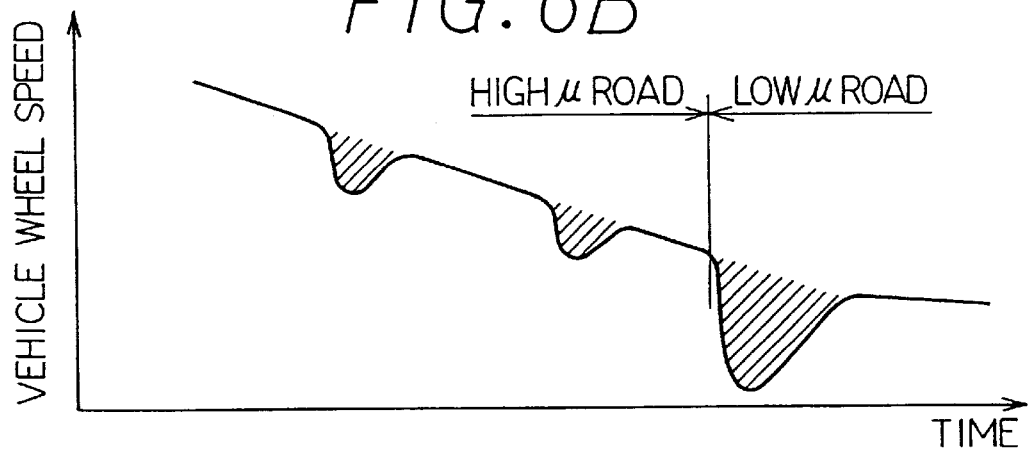

Next, processing for the determination permission of a descending grade performed in the foregoing step 100 will be described with reference to the flowchart of FIG. 5 and the graphs of FIGS. 6A and 6B.

First, step 210 determines whether anti-skid control (ABS control) is in progress. If so, execution advances to step 220; if not, execution advances to step 260.

Step 220 determines whether a road transfer exists. If so, execution advances to step 230; if not, execution advances to step 260. That is, this step determines from the state of drop in wheel speed whether a change in road surface from a low $\mu$ road to a high $\mu$ road or a change in road surface from a high $\mu$ road to a low $\mu$ road exists. In specific terms, wheel speed changes such as those shown in FIG. 6A occur in a case of change in road surface from a low $\mu$ road to a high $\mu$ road, and wheel speed changes such as those shown in FIG. 6B occur in a case of change in road surface from a high $\mu$ road to a low $\mu$ road, and so it is determined from the state of drop in wheel speed indicated by slanted lines in the two drawings whether a road transfer exists. This determination is performed to detect a descending grade condition in a stabilized state.

Step 230 determines whether an all wheel step increase mode exists. That is, this step determines whether a state exists wherein pressure is increased gradually and stably in a normal stepwise fashion. If so, execution advances to step 250; conversely, if not, execution advances to step 260.

In step 260, a flag KHF indicating descending grade determination permission is set, and this processing ends.

Meanwhile, in the foregoing step 260, a descending grade condition is considered to be not a stable control region but a state wherein a descending grade condition cannot be detected with good accuracy, the flag KHF indicating descending grade determination permission is reset, and this processing ends.

Figure 7:
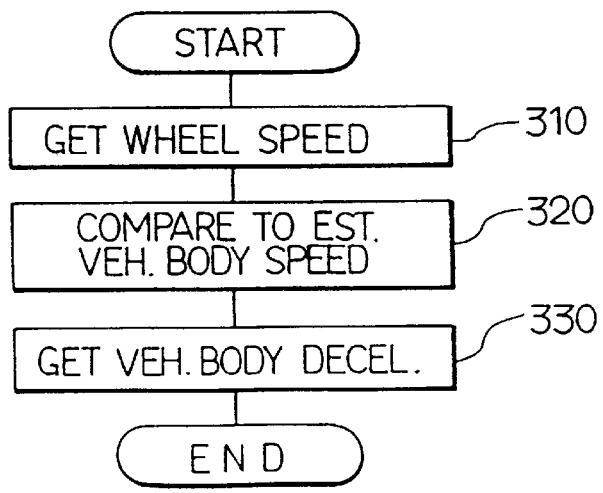
FIG. 7 is a flowchart showing estimated vehicle body deceleration calculation processing in the first embodiment.

Next, a method of computing estimated vehicle body deceleration employed in the foregoing step 120 will be described with reference to the flowchart of FIG. 7.

First, step 310 calculates wheel speed based on signals from the wheel speed sensors 5–8.

Subsequently, step 320 computes estimated vehicle body speed Vb of the vehicle based on this wheel speed. Herein, the largest speed among the wheel speeds of the wheels 1–4 is taken to be Vs, and the foregoing vehicle body speed Vb is computed according to Equation (1):

$$Vb(n)=MED[Vb(n-1)-Kdown\cdot \Delta T, Vs(n), Vb(n-1)+Kup\cdot \Delta T] \qquad (1)$$

where Vb is vehicle body speed, MED is a median value function, Kdown is a wheel deceleration lower limit constant, $\Delta T$ is a computation period, Vs is a maximum wheel speed, Kup is a wheel deceleration upper limit constant and n is the number of computations.

When calculating vehicle body speed Vb, a fixed value of, for example, 1.2 G ("G" indicating acceleration of gravity) is used for the foregoing wheel deceleration lower limit constant Kdown and a fixed value of, for example, 0.6 G is used for the wheel deceleration upper limit constant Kup.

Subsequently, step 330 calculates vehicle body deceleration δVb based on the vehicle body speed computed in the foregoing step 310. Herein, amount of change in vehicle body speed Vb during time δt is calculated as mean vehicle body deceleration δVbx by Equation (2) below, and this mean vehicle body deceleration δVbx is employed in Equation (3) below to obtain a computed value wherein an amount of change from the computed value of vehicle body speed according to the previous computation has been restricted as estimated vehicle body deceleration δVb:

$$\delta Vbx(n)=[Vb(n-1)-Vb(n)]/\delta t \qquad (2)$$

where δt is the computation period and n is the number of computations, and $$\delta Vb(n)=MED[\delta Vb(n-1)-Kp\text{down}\cdot \Delta T, \delta Vbx(n), \delta Vb(n-1)+ Kpup\cdot \Delta T]-KGH \qquad (3)$$

where δVb is the estimated vehicle body deceleration, MED is a median value function, Kpdown is a deceleration change guard lower limit variable, $\Delta T$ is the computation period, δVbx is the mean vehicle body deceleration, Kpup is the deceleration change guard upper limit variable, n is the number of computations and KGH is a compensatory variable.

When mean vehicle body deceleration δVbx which is the calculated value in Equation (2) is less than zero, the previously calculated mean vehicle body deceleration δVbx is used in Equation (3) without employing the calculated value of the present computation. Additionally, deceleration change guard lower limit variable Kpdown, deceleration change guard upper limit variable Kpup, and compensatory variable KGH are determined based on a wheel slippage ratio and a solenoid drive control pattern for the wheels.

Consequently, the estimated vehicle body deceleration δVbx calculated in step 330 and determining value 0.3 G are compared in the foregoing step 120.

Next, determination processing for comparatively high μ utilized in the foregoing step 130 will be described with reference to the flowchart of FIG. 8.

This processing (wheel acceleration information extraction processing) is for detection of a peak value of wheel acceleration and to measure time from the peak value until 0 G is reached.

Firstly, step 410 determines whether a state of descending grade determination permission exists. If so, execution advances to step 420; if not, this processing ends.

Step 420 determines whether the previous pressure reducing mode is in effect. That is, it determines whether the pressure reducing mode to reduce brake hydraulic pressure has already been set. If so, execution advances to step 430; if not, execution advances to step 530.

Step 530 determines whether a present pressure reducing mode is in effect. If so, execution advances to step 540; if not, this processing ends.

In step 540, the pressure reducing mode has been set for the first time according to the determinations of the foregoing steps 420 and 530, and so a flag KK for measuring permission is set. That is, processing to permit measurement foregoing investigating change in wheel acceleration is performed in this step.

Subsequently, in step 550, a value of a wheel acceleration peak value (peak G) is set to 0 G; subsequently, in step 560, a time counter is set to 0, and this processing ends.

Meanwhile, step 430, to which execution advances when an affirmative determination has been made in step 420, determines whether the present pressure reducing mode is in effect. If so, execution advances to step 450; if not, this processing ends.

Step 450 determines whether peak G exceeds 0 G. This peak G indicates an extreme value (point P1) wherein wheel acceleration initially changes from rising to falling, as shown in the above-described FIGS. 18A and 18B, and this step checks whether this peak G is a positive value. If so, execution advances to step 460; if not, execution jumps to step 500.

In step 460, peak G is positive and is an appropriate value for performing measurement, and so the time counter is incremented.

Subsequently, step 470 determines whether wheel acceleration is less than 0 G (point P2) as shown in FIGS. 18A and 18B. That is, this step determines whether timing for ending measurement is in effect. If so, execution advances to step 480; if not, execution jumps to step 500.

In step 480, road μ height detecting processing which will be described in detail later with reference to FIG. 9 is performed. Then, timing for ending measurement and prohibiting measuring is performed in step 490.

Subsequently, step 500 determines whether peak G is less than the presently calculated wheel acceleration. If so, execution advances to step 510; if not, this processing ends.

In step 510, the presently calculated wheel acceleration is greater than peak G, and so this value of wheel acceleration that taken to be peak G. Subsequently, in step 520, the time counter is set to 0, and this processing ends.

Next, road μ height detecting processing performed in the foregoing step 480 will be described with reference to FIG. 9. Because this processing is for detecting height of road μ based on change in wheel acceleration, a principle thereof will be described in detail.

Figure 1:
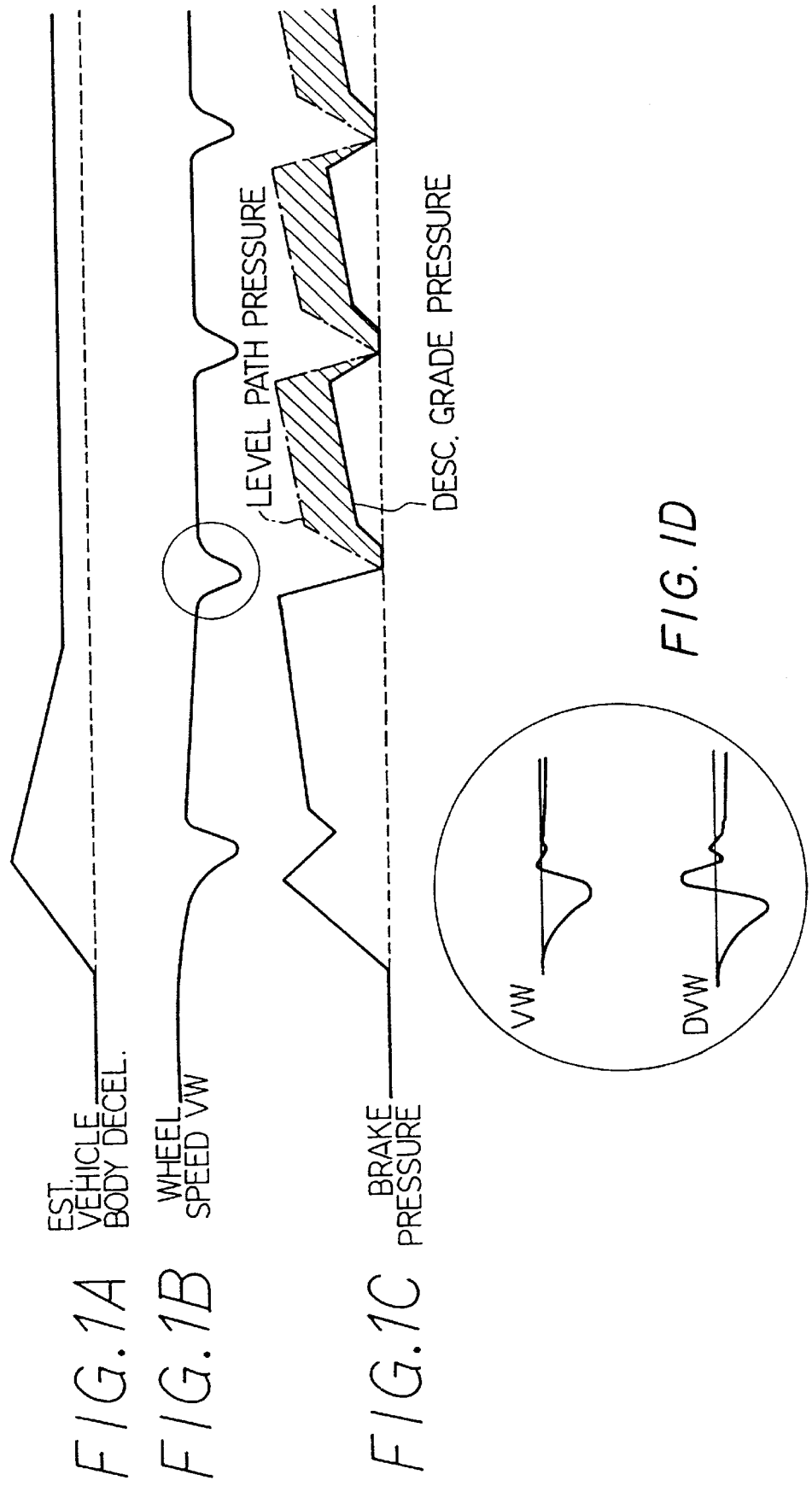
FIGS. 1A–1D are graphs showing a control waveform and the like of brake hydraulic pressure according to a first preferred embodiment of the present invention, FIG. 1D being an enlargement of the waveform of FIG. 1B.

A state of decline of wheel speed (VW) accompanying reduction of brake hydraulic pressure and change in wheel acceleration (DVW) due thereto are shown in an enlarged portion (detail of a wheel recovery state) of FIG. 1B;, and the size of road $\mu$ is calculated from this change in wheel acceleration.

In specific terms, in the case of a low $\mu$ road (i.e., a comparatively high $\mu$ road, for example, a road having a $\mu$ in a range of 0.3 to 0.4 G) of a snow-packed road or the like, peak G of wheel acceleration is large and moreover time from peak G until 0 G is short, as shown in FIG. 18A. Meanwhile, in a case of an extremely low $\mu$ road (i.e., a comparatively low $\mu$ road, for example, a road having a $\mu$ in a range of 0.1 to 0.2 G or less) of an icy road or the like, peak G of wheel acceleration is small and moreover, time from peak G until 0 G is long in comparison with a low $\mu$ road as shown in FIG. 18B. Accordingly, it can be determined from the difference in this change in wheel acceleration whether the road is low $\mu$ or extremely low $\mu$.

Next, road $\mu$ height detecting processing performed in based on this principle will be described with reference to FIG. 9.

Step 610 in FIG. 9 determines whether a state where descending grade determination is permitted exists. If so, execution advances to step 620; if not, execution advances to step 660.

In step 660, a wheel acceleration (wheel G) information counter is cleared, and this processing ends. This wheel G information counter is used to accurately determine road $\mu$ as will be described later.

Meanwhile, step 620 determines whether peak G is a large value exceeding +5 G. If so, execution advances to step 630; conversely, if not, execution advances to step 650.

Step 630 determines whether measured time is a small value (indicating a large degree of convergence) of 20 ms or less. If so, execution advances to step 640; conversely, if not, execution advances to step 650.

In step 640, because it was determined in the foregoing steps 620 and 630 that peak G is large and convergence time is large, i.e., because it was determined that a condition of a comparatively high $\mu$ road with a large road $\mu$ rather than a comparatively low $\mu$ road was matched, as shown in FIGS. 18A and 18B, the wheel G counter is incremented.

Meanwhile, in step 650, because it was determined in the foregoing steps 620 and 630 that peak G is small or convergence time is long, i.e., because it was determined that a condition of a comparatively high $\mu$ road was not matched, the wheel G counter is decremented.

Subsequently, step 670 determines whether the wheel G information counter is at least three, to assess the condition of the road surface more accurately. If so, execution advances to step 680; if not, execution advances to step 680.

Step 680 determines that a comparatively high $\mu$ road exists, the comparatively high $\mu$ road determination flag KMF is set, and this processing ends. Alternatively, step 690 determines that a comparatively low $\mu$ road exists, the comparatively high $\mu$ road determination flag KMF is reset, and this processing ends.

According to the above-described descending grade condition detecting apparatus, when estimated vehicle body deceleration time is determined to be smaller than or equal to a predetermined value and road $\mu$ is a comparatively high $\mu$ indicating a low $\mu$ based on a principle of detecting the above-described low $\mu$ descending grade of a snow-packed road or the like when descending grade determination permission has been granted and a stable control state exists, the descending grade condition is determined to exit, and so a marked effect wherein a descending grade condition can accurately be detected is demonstrated.

That is, a chance exists that accurate information relating to wheel speed cannot be obtained and incorrect control is performed, depending on the road surface state, but according to this embodiment, a road surface over which a vehicle is traveling can accurately be detected to be a low $\mu$ descending grade of a snow-packed road or the like.

In particular, according to this embodiment, a descending grade condition can be detected at each of the wheels, and so an advantage exists wherein brake hydraulic pressure can be controlled appropriately for each of the wheels, as will be described later.

Next, anti-skid control performed based on a detection result obtained by the above-described descending grade condition detecting processing will be described with reference to the flowchart of FIGS. 10–13.

Figure 10:
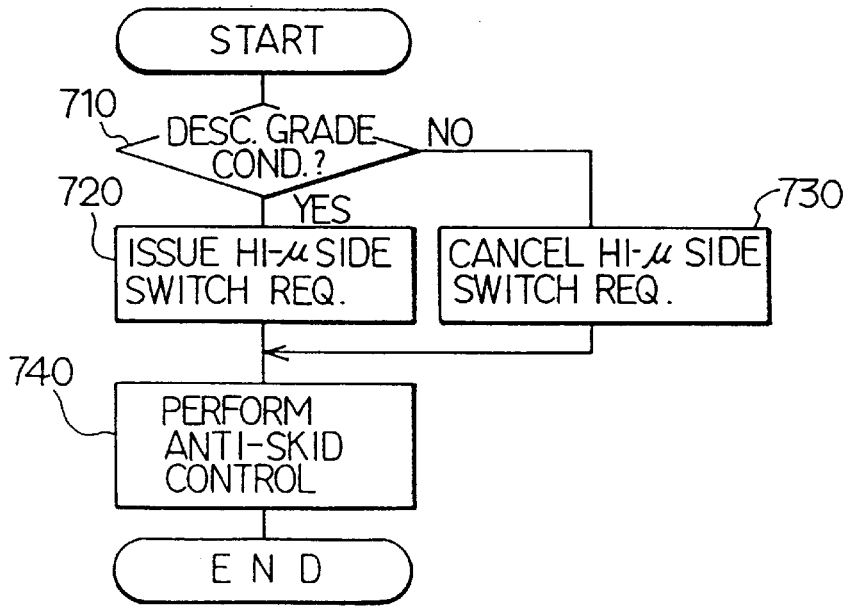
FIG. 10 is a flowchart showing anti-skid control processing according to the first embodiment.

Step 710 of FIG. 10 determines whether a descending grade condition exists for the wheels based on the detection results of the foregoing steps 140 and 160. If so, execution advances to step 720; if not, execution advances to step 730.

In step 720, a comparatively high $\mu$ side control switching request is performed with respect to each of the wheels for which a descending grade condition was determined to exist. This comparatively high $\mu$ side control switching request is a request to control brake hydraulic pressure toward reduction to be compatible with braking during travel on a comparatively high $\mu$ road.

Figures 11A, 11B, 11C, 11D:
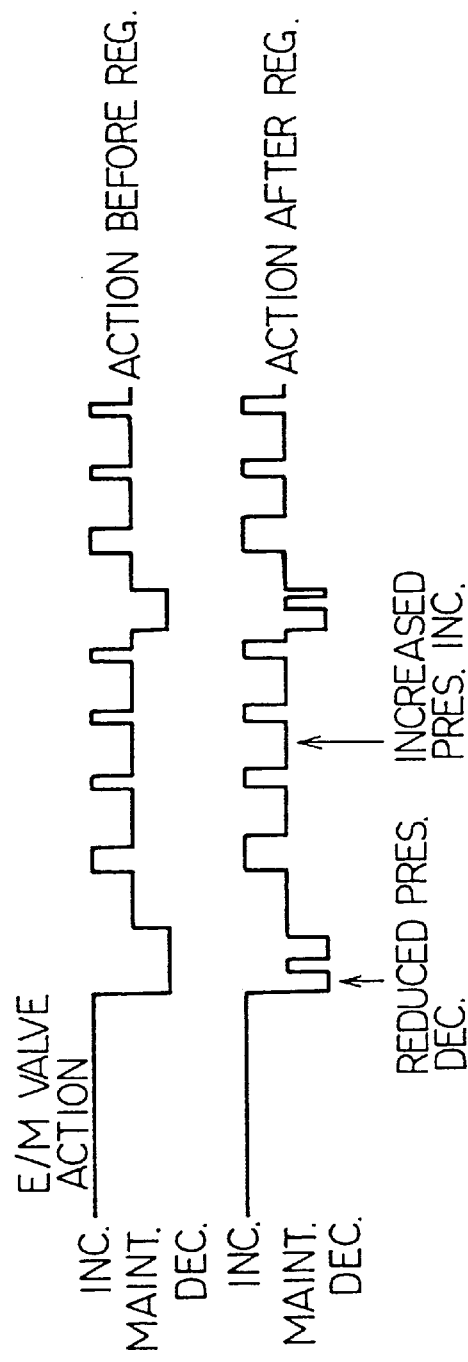
FIGS. 11A–11D show anti-skid control signals in the first embodiment.

In specific terms, where this comparatively high $\mu$ side control switching request exists, as shown in FIGS. 11C and 11D, control to increase brake hydraulic pressure is performed by switching actuators 21–24, which are solenoid valves, from pre-regulation operation to post-regulation operation as shown in the Figures and performing a reduction in the amount of pressure reduction and an increase in the amount of pressure increase. Because of this, brake hydraulic pressure is increased as shown by the dotted line in FIG. 11B. Additionally, the control reference in the drawing establishes predetermined reduction start timing and pressure increase start timing, as will be described later.

Meanwhile, in step 730, the comparatively high $\mu$ side control switching request is canceled for wheels determined not to be in a descending grade condition. Subsequently, step 740 performs anti-skid control by operating control signals to the actuators 21–24 and controlling brake hydraulic pressure based a state of the comparatively high $\mu$ side control switching request, and this processing ends.

In this way, according to this embodiment, in a case of a low $\mu$ (i.e., a comparatively high $\mu$) descending grade road of a snow-packed road or the like, because control is performed to increase brake hydraulic pressure to more than in a case of an extremely low $\mu$ road instead of establishing a low brake hydraulic pressure corresponding to an extremely low $\mu$ (i.e., a comparatively low $\mu$) descending grade road of an icy road or the like as in the prior art, i.e., because brake hydraulic pressure suited to the actual road surface condition is established, a marked effect is demonstrated wherein braking performance can be improved.

Moreover, according to this embodiment, a descending grade condition is detected with respect to the wheels and high brake hydraulic pressure is applied to the wheel cylinders even in ABS, but this descending grade condition does not represent merely a descending grade, but rather can also accommodate, for example, a descending portion of a comparatively large unevenness under one wheel.

A second preferred embodiment of the present invention detects a descending grade condition relating not to the wheels but rather to an entire vehicle, and performs detailed anti-skid control based thereon. Description of portions similar to the above-described first embodiment will be omitted or abridged.

Figure 12:
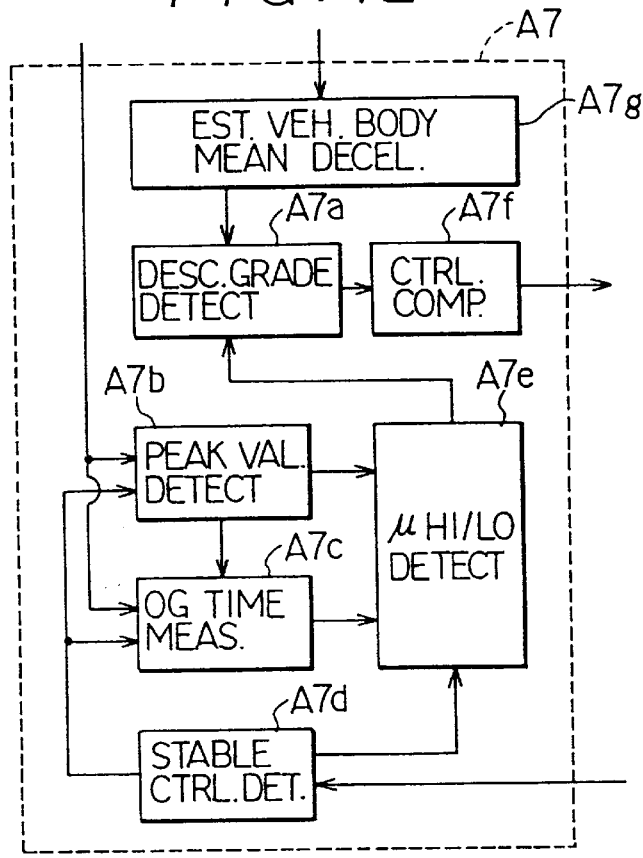
FIG. 12 is a block diagram showing a processing sequence according to a second embodiment preferred embodiment of the present invention.
Figure 17:
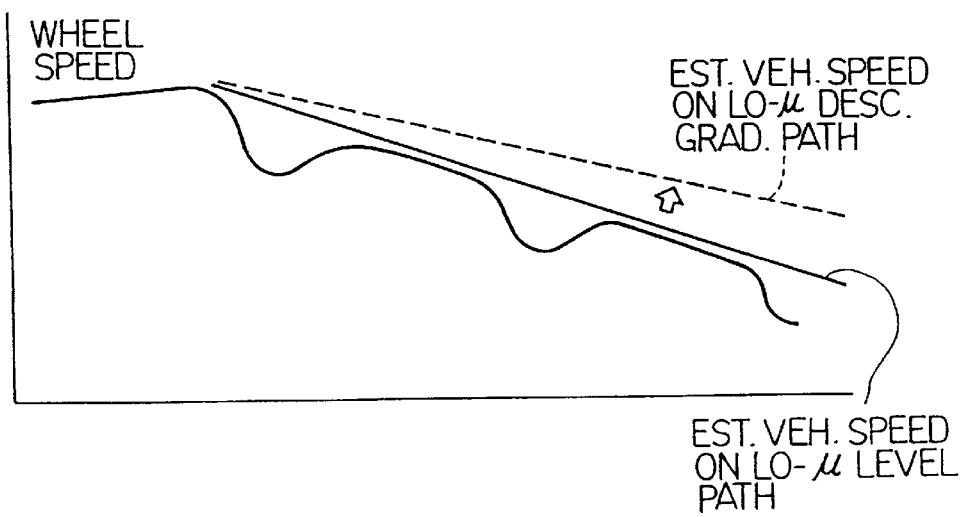
FIG. 17 is a graph showing anti-skid control according to the prior art.

First, an overview of a sequence of descending grade condition detecting processing according to this embodiment will be described with reference to the block diagram of FIG. 12.

According to this embodiment, only the descending grade condition compensating unit A7 differs from the corresponding portion of the foregoing first embodiment. Namely, output from the estimated vehicle body deceleration arithmetic unit A5 is input to an estimated vehicle body deceleration mean value arithmetic unit A7g of the descending grade condition compensating unit A7, a mean value of estimated vehicle body deceleration during a predetermined period is calculated by this estimated vehicle body deceleration mean value arithmetic unit A7g, this mean value is output to the descending grade condition detecting unit A7a, and thereafter processing similar to that of the first embodiment is performed.

Figure 13:
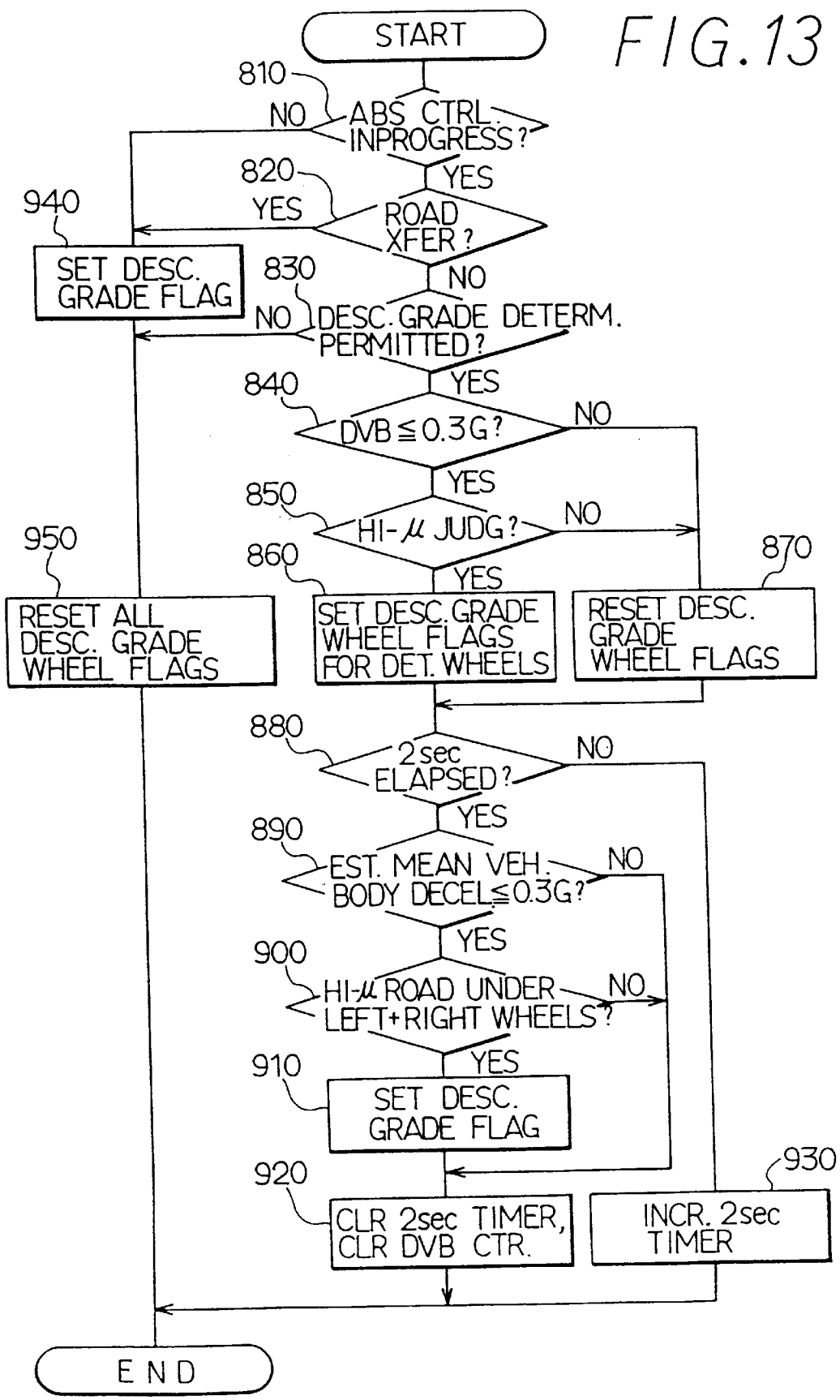
FIG. 13 is a flowchart showing descending grade condition detecting processing according to the second embodiment.

Next, descending grade condition detecting processing of this embodiment will be described with reference to the flowchart of FIG. 13.

First, step 810 determines whether anti-skid control (ABS control) is in progress. If so, execution advances to step 820; if not, execution advances to step 940. Step 820 determines whether a road transfer exists. If so, execution advances to step 830; if not, execution advances to step 940.

In step 940, a condition of descending grade condition detection is not fulfilled, and so a vehicle descending grade condition flag SKF indicating that the entire vehicle (not the individual wheels) is traveling on a low $\mu$ descending grade of a snow-packed road or the like is reset, and this processing ends.

Alternatively, step 830 determines whether permission has been granted to perform descending grade determination. If so, execution advances to step 840; if not, execution advances to step 950.

In step 950, wheel descending grade condition flags KF indicating a condition of a low $\mu$ descending grade of a snow-packed road or the like for each of the wheels are respectively reset with respect to all wheels, and this processing ends.

Meanwhile, step 840 determines whether estimated vehicle body deceleration is 0.3 G or less. If so, execution advances to step 850; if not, execution advances to step 870.

Step 850 determines whether comparatively high $\mu$ exists at each of the wheels. If so, execution advances to step 860; if not, execution advances to step 870.

In step 860, it was determined that estimated vehicle body deceleration is small and moreover that comparatively high $\mu$ exists, and so the wheel descending grade condition flags KF indicating the foregoing descending grade condition are set to indicate that the condition of the road over which the wheels for which the determination was made are traveling is a low $\mu$ descending grade condition of a snow-packed road or the like.

Meanwhile, in step 870, the condition that estimated vehicle body deceleration is small and moreover that comparatively high $\mu$ exists has not been fulfilled, and so wheel descending grade condition flags KF indicating a condition of a low $\mu$ descending grade of a snow-packed road or the like for each of the wheels are respectively reset with respect to all wheels, and this processing ends.

Subsequently, step 880 determines whether two seconds have elapsed to calculate a mean value of estimated vehicle body deceleration. If so, execution advances to step 890; if not, execution advances to step 930.

In step 930, two seconds have not yet elapsed, and so a two-second counter for counting thereof is incremented, integration of estimated vehicle body deceleration (DVB) is performed using an estimated vehicle body deceleration integrating counter, and this processing ends.

Meanwhile, in step 890, two seconds have elapsed, and so the integrated value for estimated vehicle body deceleration is divided by the number of integrations to obtain the mean value for estimated vehicle body deceleration, and it is determined whether this mean value is 0.3 G or less. If so, execution advances to step 900; if not, execution advances to step 920.

To detect a descending grade condition more accurately, step 900 checks whether a comparatively high $\mu$ road exists relating to the left-hand and right-hand wheels. If so, execution advances to step 910; if not, execution advances to step 920.

In step 910, the vehicle descending grade condition flag SKF is set to indicate a condition where the entire vehicle is traveling on a low $\mu$ descending grade of a snow-packed road or the like. Subsequently, in step 920, the foregoing two-second counter is cleared, and along with this, the estimated vehicle body deceleration integrating counter is cleared, and this processing ends.

This embodiment detects not only a descending grade condition at the wheels but also a descending grade condition relating to the entire vehicle, and so an effect is demonstrated wherein a descending grade condition can be more accurately detected.

In particular, according to this embodiment, when detecting a descending grade condition relating to an entire vehicle, a low $\mu$ descending grade of a snow-packed road or the like is determined to exist only when a mean value of estimated vehicle body deceleration is a predetermined value or less and a condition of a comparatively high $\mu$ road exists for the left-hand and right-hand wheels, and so an advantage exists where detection of a detailed descending grade condition can be performed.

Next, anti-skid control performed based on the above-described descending grade condition detection result will be described with reference to the flowchart of FIG. 14 and the graphs of FIGS. 15A and 15B.

Figure 14:
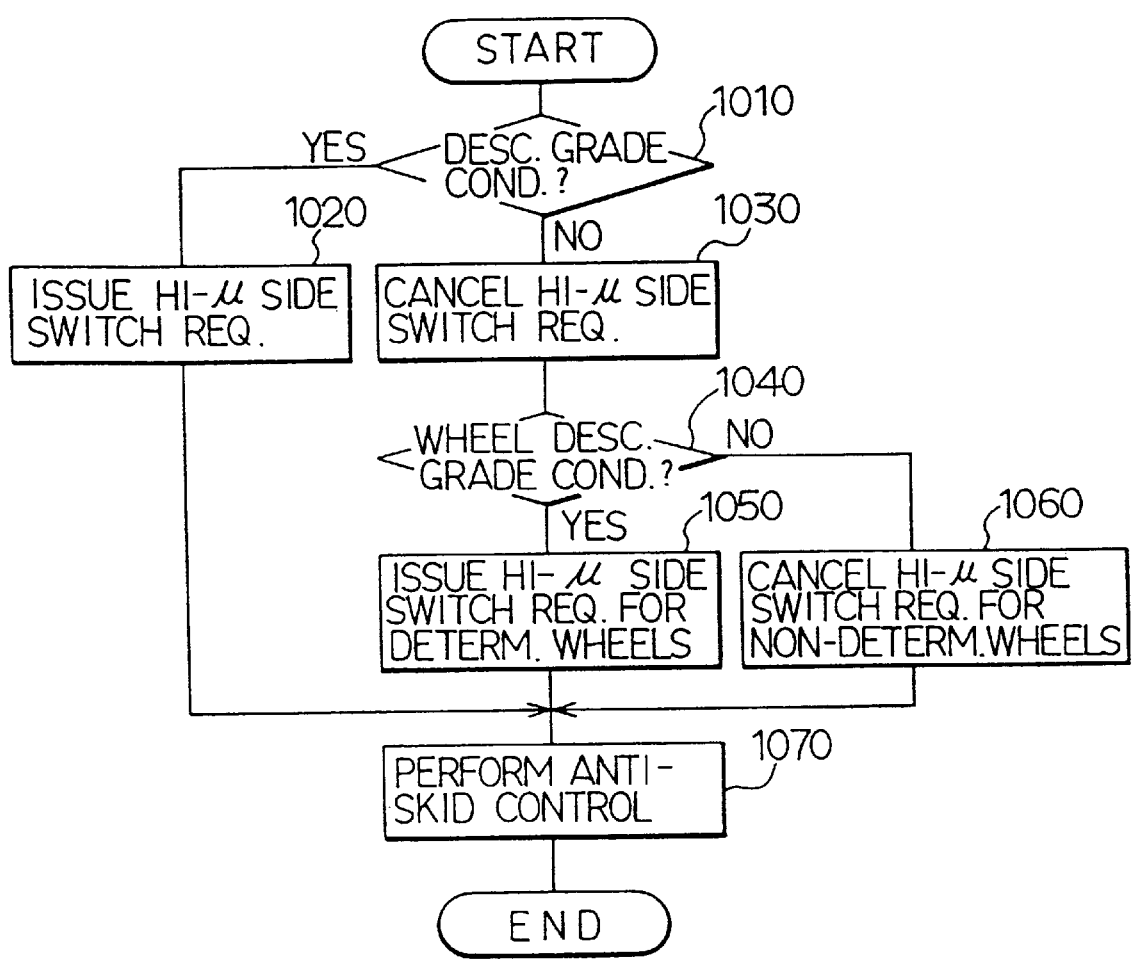
FIG. 14 is a flowchart showing anti-skid control processing according to the second embodiment.

Step 1010 of FIG. 14 determines whether a descending grade condition relating to the entire vehicle exists. If so, execution advances to step 1020; if not, execution advances to step 1030.

In step 1020, a descending grade condition relating to the entire vehicle exists, and so a switching request to control all wheels to a comparatively high $\mu$ side is performed, and execution advances to step 1070, which will be described later. Alternatively, in step 1030, a descending grade condition relating to the entire vehicle does not exist, and so the foregoing switching request to control to the comparatively high $\mu$ side is canceled.

Subsequently, step 1040 detects whether a descending grade condition exists with respect to the wheels. If so, execution advances to step 1050; if not, execution advances to step 1060.

In step 1050, the comparatively high $\mu$ side control switching request is performed with respect to each of the wheels for which a descending grade condition was determined to exist. Alternatively, in step 1060, the comparatively high $\mu$ side control switching request is canceled with respect to each of the wheels for which a descending grade condition was determined not to exist.

Subsequently, in step 1070, anti-skid control is performed based on the state of the comparatively high $\mu$ side control switching request with respect to all wheels or individual wheels by outputting control signals to the actuators 21–24 and controlling brake hydraulic pressure, and this processing ends.

In particular, in control of brake hydraulic pressure when a descending grade condition relating to the entire vehicle has been detected, this embodiment performs not only switching of a control pattern for the solenoid valves like the control pattern of the above-described first embodiment, but simultaneously also switching of a control reference as shown in FIG. 15B.

This control reference represents a decrease of several percent in the estimated vehicle body speed calculated based on wheel speed; pressure reducing timing is a time when wheel speed has traversed and become less than the control reference, and pressure increasing timing is a time when wheel speed has traversed and become greater than the control reference. Consequently, when this control reference has been switched to a lower side, as shown by the dotted line in FIGS. 15A and 15B, brake hydraulic pressure comes to be controlled to the pressure increasing side, as indicated by the dotted line in those Figures.

In this way, when a descending grade condition relating to the entire vehicle has been detected, this embodiment controls brake hydraulic pressure to a pressure increasing side by switching a control reference and changing pressure decreasing and pressure increasing timing according to the above-described detailed determinations, and moreover switches a pressure decreasing and pressure increasing control pattern similarly to the foregoing first embodiment to control brake hydraulic pressure to a pressure increasing side. For this reason, control of brake hydraulic pressure on a low $\mu$ descending grade of a snow-packed road or the like can reliably be performed, and so an effect is demonstrated wherein braking performed is greatly improved.

Additionally, a pressure decreasing and pressure increasing control pattern is switched and brake hydraulic pressure is controlled to a pressure increasing side when a descending grade condition has been determined to exist for individual wheels, even when the condition is determined not to be a descending grade condition relating to the entire vehicle, and so there exists an advantage wherein required control of brake hydraulic pressure is performed and braking performance can be improved.

Figure 16:
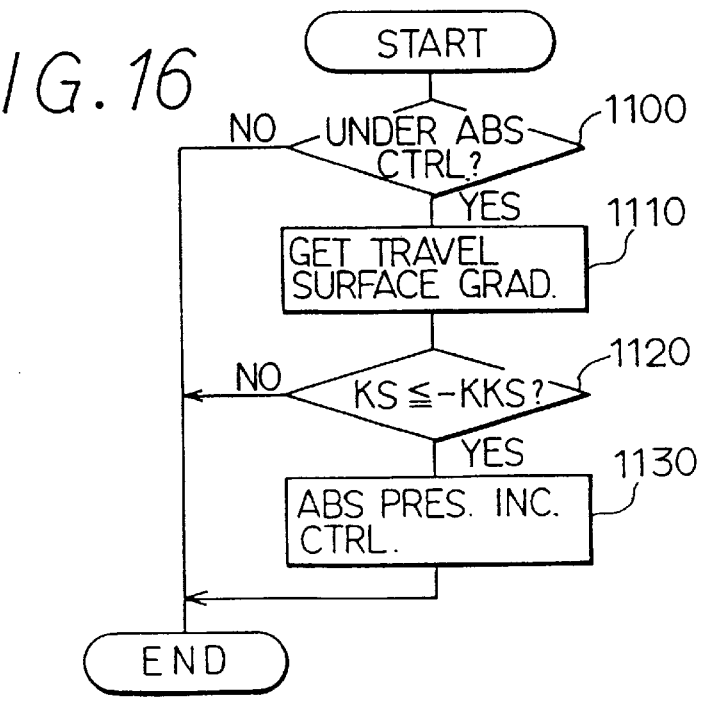
FIG. 16 is a flowchart showing processing according to a third preferred embodiment of the present invention.

According to the above-described first and second embodiments, a descending grade condition was detected based on vehicle body speed and a road friction state, a control reference in anti-skid control on a descending grade road of a snow-packed road was changed, and brake hydraulic pressure applied to a wheel cylinder became a high brake hydraulic pressure. According to this third embodiment, however, a descending grade condition is detected by, for example, a gradient sensor or the like (not shown), and brake hydraulic pressure applied to a wheel cylinder is increased in accordance with a result thereof, as shown in FIG. 16.

Firstly, step 1100, determines whether anti-skid control has been started. If so, execution advances to the subsequent step. In step 1110, the gradient of the present traveling surface is detected by a gradient sensor. In step 1120, an output value KS from the gradient sensor is compared with a predetermined value KKS, and it is determined whether the present traveling surface of the vehicle is a predetermined descending grade road or more. If so, execution advances to step 1130; if not, this processing is ended.

In step 1130, ABS pressure increasing control is executed. In this ABS pressure increasing control, as was described in detail for the embodiments described heretofore, it is acceptable to change a control reference for anti-skid control to increase brake hydraulic pressure applied to the wheel cylinders, and it is also acceptable merely to lengthen pressure increasing time of brake hydraulic pressure applied to the wheel cylinders with no regard to a control reference. At this time, it is also acceptable, for example, to execute pressure increase with priority to the front wheel side demonstrating large wheel braking force accompanying shifting of vehicle load.

In this way, a wheel braking state of at least some wheels can rapidly and reliably reach a road surface limit even when a descending grade condition is detected and wheel cylinder pressure is increased without regard to a road friction state, and so vehicle deceleration can further be implemented. Moreover, because pressure decrease or holding of the brake hydraulic pressure applied to the wheel cylinders based on, for example, a wheel slippage ratio or the like is executed in ordinary anti-skid control when the road surface limit has been reached, vehicle behavior can be assured even when increase in wheel cylinder pressure on a descending grade road is constantly performed.

Further, it is acceptable to add a step to detect a road friction state between step 1120 and step 1130 in the flowchart of FIG. 16 according to this embodiment. At this time, it is also acceptable to prohibit execution of ABS pressure increasing control in step 1130 on an extremely low $\mu$ road of an icy road or the like. That is, a controllable margin with respect to the road surface limit is inherently small on an icy road, and the possibility of exerting a favorable influence on vehicle behavior and vehicle body deceleration is low. Accordingly, it is acceptable to prohibit increase in wheel cylinder pressure at such a time. Additionally, it is also acceptable to detect a road friction state and vary an amount of pressure increase of brake hydraulic pressure applied to a wheel cylinder in accordance with this road friction state. That is, it is acceptable that an amount of pressure increase is increased on a dirt road or a wet asphalt road having a somewhat high $\mu$ in comparison with amount of pressure increase in a road friction state corresponding to a snow-packed road. When this is done, vehicle body deceleration can further be earned.

Moreover, this invention is not restricted to the above-described embodiments, but naturally can be embodied in various modes within a scope which does not deviate from the essence of the embodiments.

For example, a descending grade condition can be detected according to the foregoing first and second embodiments, and so it is possible to apply this invention not merely in anti-skid control, but also in traction control, yaw control, and the like.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A descending grade condition detecting apparatus comprising:
    wheel speed detecting means for detecting information relating to vehicle wheel speed subsequent to reduction of brake hydraulic pressure on wheels of a vehicle and for generating signals representative of said information relating to vehicle wheel speed;
    estimated vehicle body deceleration calculating means for calculating estimated vehicle body deceleration based on said signals representative of information relating to vehicle wheel speed;

road friction coefficient calculating means for calculating a road friction coefficient based on said signals representative of information relating to vehicle wheel speed; and descending grade condition detecting means for detecting a descending grade condition based on said estimated vehicle body deceleration calculated by said estimated vehicle body deceleration calculating means and said road friction coefficient calculated by said road friction coefficient calculating means.

2. A descending grade condition detecting apparatus according to claim 1, wherein said information relating to vehicle wheel speed used in calculation of said estimated vehicle body deceleration is vehicle wheel speed information.

3. A descending grade condition detecting apparatus according to claim 1, wherein said information relating to vehicle wheel speed used in calculation of said road friction coefficient is at least one of vehicle wheel speed information and vehicle wheel acceleration information.

4. A descending grade condition detecting apparatus according to claim 1, wherein said road friction coefficient calculating means is for calculating said road friction coefficient based on time required for vehicle wheel acceleration to change from a peak value to a predetermined value.

5. A descending grade condition detecting apparatus according to claim 1, wherein said descending grade condition detecting means is for detecting a condition of a descending grade of low friction coefficient when estimated vehicle body deceleration calculated by said estimated vehicle body deceleration calculating means does not exceed a predetermined value and a road friction coefficient calculated by said road friction coefficient calculating means is at least a predetermined value.

6. A descending grade condition detecting apparatus according to claim 1, wherein said descending grade condition detecting means is for detecting said descending grade condition for each of the vehicle wheels.

7. A descending grade condition detecting apparatus according to claim 1, wherein said estimated vehicle body deceleration calculating means is for using an average value of estimated vehicle body deceleration during a predetermined period as said estimated vehicle body deceleration.

8. A descending grade condition detecting apparatus according to claim 7, wherein said descending grade condition detecting means is for detecting a condition of a descending grade of low friction coefficient when said average value of estimated vehicle body deceleration calculated by said estimated vehicle body deceleration calculating means is not more than a predetermined value and said road friction coefficient at left and right wheels calculated by said friction coefficient calculating means is at least a predetermined value.

9. A descending grade condition detecting apparatus according to claim 1, further comprising brake controlling means for controlling said brake hydraulic pressure responsive to detection of said descending gradient condition by said descending grade condition detecting means.

10. A descending grade condition detecting apparatus according to claim 9, wherein:

said descending grade condition detecting means is for detecting a condition of a descending grade of low friction coefficient when said estimated vehicle body deceleration calculated by said estimated vehicle body deceleration calculating means does not exceed a predetermined value and said road friction coefficient calculated by said friction coefficient calculating means is at least a predetermined value; and said brake controlling means is for regulating brake hydraulic pressure on a side of said vehicle where vehicle wheel braking force increases and for performing anti-skid control when a condition of a descending grade of low friction coefficient has been detected by said descending gradient condition detecting means.

11. A descending grade condition detecting apparatus according to claim 9, wherein:

said descending grade condition detecting means is for detecting said descending grade condition for each of the vehicle wheels; and said brake controlling means is for increasing vehicle wheel braking force and for performing anti-skid control with respect to said vehicle wheels when a condition of a descending grade of low friction coefficient at each vehicle wheel has been detected by said descending gradient condition detecting means.

12. A descending grade condition detecting apparatus according to claim 11, wherein said brake controlling means is for regulating an amount of varying pressure output of brake hydraulic pressure when performing said anti-skid control on a vehicle side wherein vehicle wheel braking force of each of the vehicle wheels increases.

13. A descending grade condition detecting apparatus according to claim 1, wherein:

said estimated vehicle body deceleration calculating means is for using an average value of estimated vehicle body deceleration during a predetermined period as said estimated vehicle body deceleration;

said descending grade condition detecting means detects a condition of a descending grade of low friction coefficient when said average value of estimated vehicle body deceleration calculated by said vehicle body estimated deceleration calculating means is not more than a predetermined value and said road friction coefficient at left and right wheels calculated by said friction coefficient calculating means is at least a predetermined value; and said brake control means is for increasing vehicle wheel braking force and for performing anti-skid control with respect to all vehicle wheels when a condition of a descending grade of low friction coefficient has been detected.

14. A descending grade condition detecting apparatus according to claim 13, wherein said brake control means is for performing switching of a control reference to determine starting and ending timing of varying pressure output of brake hydraulic pressure and regulation of an amount of varying pressure output of brake hydraulic pressure to perform said anti-skid control on a side wherein vehicle wheel braking force of each of the vehicle wheels increases.

* * * * *